2,953,611

METHOD AND ADDITION COMPOUNDS FOR SEPARATING OLEFINES FROM MIXTURES

Günter Spengler, 34 Georgenstrasse, Munich, Germany

No Drawing. Filed Oct. 19, 1956, Ser. No. 616,938

Claims priority, application Germany Oct. 29, 1955

15 Claims. (Cl. 260—677)

This invention relates to methods for separating olefines from mixtures with other materials by chemical reaction to form an addition product and, more particularly, to producing addition compounds of mercury salts with olefines, which compounds can be readily separated from other materials for use per se or from which olefines can readily be regenerated.

It is frequently desired to remove from mixtures of organic materials those constituents thereof having an olefine double bond either because the olefine material itself is desired or because it must be removed to purify the organic material with which it is admixed. If it is attempted to accomplish such separation of olefines materials by physical methods—e.g., fractional distillation, adsorption on activated carbon etc.—it may be found that there are many olefine materials not susceptible to such separation. For example, fractional distillation techniques for separating olefines from a mixture of olefines and paraffins may be applicable in the lower molecular weight ranges where the influence of the olefine double bond on the physical behavior of the material is less perceptible than with higher molecular weight compounds. Whereas little difficulty may be experienced in separating propane and propylene or ethane and ethylene by adsorption or fractional distillation, considerable difficulty has been experienced in attempting to utilize such separation techniques on hydrocarbons having substantially higher molecular weights, in view of, for example, the larger number of isomers and less difference in boiling points as the molecular weight increases.

Similarly, if it is attempted to separate olefines from, for example, mixtures of olefine and other hydrocarbons by chemical means, difficulty may be experienced in obtaining a separation product from which the olefine can be regenerated in an economical manner or which is itself economically useful. Similarly, difficulty may be experienced in attempting such chemical separating techniques to avoid undesired degradation of the olefine material and, particularly with olefines of the higher molecular weights, to avoid undesired isomerization or migration of the olefine double bond. Although olefines may form a separable addition product with such organic substances as diphenylketene and/or with a number of heavy metal salts, difficulty may be experienced because of the obnoxious nature or temperature and oxidation sensitivity of such organic compounds as well as, from a practical standpoint, because of the cost of appropriate heavy metal salts.

According to this invention, however, the separation of olefine materials from other materials with which they may be admixed and the separation of one olefine material from another can be readily and economically carried out by the formation of a mercury salt addition product with the olefine material, which product is readily separable from other materials. This invention not only provides an economical method for the production of various addition compounds of mercury salts and olefine materials having utility in themselves, but it also provides a method for forming such addition products from which the original olefine material can readily be regenerated and to leave the mercury salt available for recycling through the olefine mixture.

One object of this invention is to provide a method for the separation of olefine materials from mixtures thereof by the formation of a readily separable olefine addition product and notwithstanding that the physical or chemical characteristics of the olefine materials and other materials in the mixture differ but slightly.

Another object of this invention is to provide a method for producing addition products of olefine materials and mercury salts of the organic acids by the reaction thereof in the presence of an organic material having an active or free hydrogen atom.

A further object of this invention is to provide addition compounds of the character described of olefine and mercury salt materials from which the olefine can be readily regenerated without isomerization or migration of the olefine double bond and from which the mercuric salt material can also be regenerated for reuse as such.

Still another object of this invention is to provide a method for the convenient and economical large scale production of addition compounds of olefines and mercury salts which compounds have commercial utility per se or are useful in methods of separating olefines from mixtures with other materials.

Other objects and advantages of this invention will become apparent from the following description and the appended claims.

According to this invention, mercury salts of organic acids are reacted with olefines or mixtures of olefines in the presence of a solvent or other organic materials having active or free hydrogen atom available in the molecule. It has been found that the mercuric salt of every organic monobasic or polybasic carboxylic acid of either the aliphatic or aromatic series, including hydroxy acids, ketone acids and halogenated acids, enters appropriately into the reactions involved in methods embodying this invention. According to this invention, such mercuric salts form addition products selectively with olefine materials, even when admixed with other closely related organic materials, and may be used satisfactorily to separate from such mixtures all organic compounds having olefine double bonds. The utility of methods embodying this invention applies not only to pure olefines such as ethylene homologues but also to other double bond materials containing aromatic nuclei (e.g., styrene) as well as to alicyclic double bond materials such as cyclohexene, methyl-cyclohexene, methene, dipentene, and, similarly, unsaturated alcohols such as allylalcohol, geraniol, citronella oil, beta carotine, steroid hormones and unsaturated acids such as fumaric acid, oleic acid, cinnamic acid, ricinoleic acid, and esters and other derivatives—all of which types of materials are referred to generally herein as olefine materials.

Satisfactory sources of a free or active hydrogen atom, for reaction with the olefine material and mercuric salts according to this invention include such hydrogen-active materials as monovalent or polyvalent aliphatic alcohols, organic acids, enols, acid amines, and water, forming, according to this invention, the corresponding alkoxyl, acetoxyl, amine, enol or hydroxyl mercuric-salt-olefine addition product. Other solvent type materials which do not contain an active hydrogen atom, such as benzene, dioxan, cyclohexane, carbon tetrachloride, etc., are not appropriate sources of hydrogen active materials. Accordingly, a large variety of combinations of reactants are available according to this invention with which satisfactory results are achieved to provide a particular reaction solution comprising an organic mercury salt and a hydrogen-active solvent or material adapted to produce, after reaction with an olefine material, an addition product of predetermined physical and chemical characteristics enabling the ready physical or chemical separation thereof from other components of the mixture in which the reaction takes place.

Furthermore, the olefine-mercury addition products according to this invention are quite resistant to most acids. In the presence of halogen ions or pseudo-halogen ions the addition products readily decompose, however, with the reformation of the original olefine material substantially without degradation or isomerization thereof. Such regeneration then, under the influence of halogen ions after the olefine mercury product has been separated from the original mixture, readily makes possible the reclamation of the olefine as well as regeneration of the original mercury salt for reuse or recycling for forming additional olefine mercury products or further separation of olefine materials from the original mixture.

As a further advantage of the reactions and methods according to this invention, the completeness of the addition reaction between the olefine material and the reaction solution of mercury salt and hydrogen-active components can readily be checked in actual operation. The olefine-mercury addition products according to this invention are quite stable to alkalis. On the other hand, as is well-known, an insoluble precipitate of HgO is formed when mercury salt solutions are treated with alkalis. One can, therefore, at any time during operation, test the completeness of the reaction or the reaction solution itself or the reaction of mixture of olefine mercury solution by taking small samples to which an alkali, such as one normal potassium hydroxide in methanol solution, is added. If the mercury salt is still present as such in the reaction mixture a precipitate will form. If no precipitate forms, there is no more mercuric salt in the material being tested uncombined with the olefine material. A test for available hydrogen-active solvent is, as a practical matter, unnecessary since such solvent is used in substantial excess in the solution as the solvent therefor.

As illustrative of reactions according to this invention, the following are noted, using the acetate as illustrative of the mercury salt, ethylene as illustrative of the olefine material, with various hydrogen-active materials:

With alcohols:

$$C_2H_4 + Hg(OOC-CH_3)_2 + ROH \rightarrow RO-CH_2CH_2-HgOOC-CH_3 + CH_3-COOH$$

With carboxylic acids:

$$C_2H_4 + Hg(OOC-CH_3)_2 + R-COOH \rightarrow R-COO-C_2H_4-HgOOC-CH_3 + CH_3-COOH$$

With amines:

$$C_2H_4 + Hg(OOC-CH_3)_2 + R-NH_2 \rightarrow R-NHC_2H_4-HgOOC-CH_3 + CH_3-COOH$$

With enols:

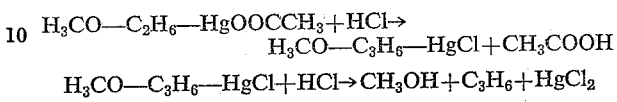

As more particularly illustrative of the reactions of this invention, the following equations are noted for the reaction of a mercury acetate in a methanol reaction solution—e.g., 10% mercuric acetate in methanol with propylene:

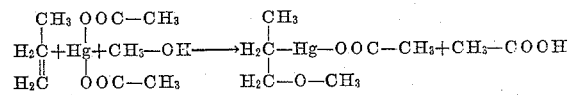

Upon preparation and separation of the olefine-mercury addition product, the olefine itself may be regenerated by treatment of the addition product with, for example, a mineral acid to regenerate the olefine itself and the original mercury salt for reuse in additional olefine separation reactions. As illustrative of such regeneration using, for example, hydrochloric acid, the reaction proceeds in two stages which can be illustrated, with reference to the mercuric acetate methyoxy propane addition product of the last equation noted above, as follows:

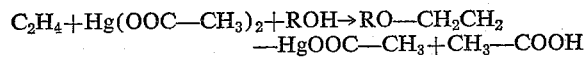
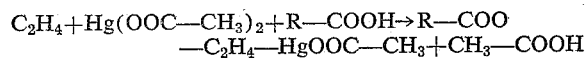

The mercuric chloride produced in the above regeneration or decomposition of the propylene mercuric product is readily separated from the reaction solution, which consists of methanol, possibly some excess of the original mercuric acetate and acetic acid liberated by the decomposition reaction. Such separation can be readily accomplished by filtration. After separation of the mercuric chloride, it is readily converted into HgO by treatment with calcium hydroxide in known manner, and the HgO then combined with the filtrate methanol-acetic acid mixture thus to obtain again the mercuric acetate salt for reuse with additional olefines.

As will be apparent from the foregoing, the separation of olefines which have low enough molecular weights to be essentially gaseous can be carried out readily as a cyclic process. In the case of olefine-containing mixtures which are viscous or solid or difficult to cause to dissolve in the reaction solutions of mercury salts and hydrogen-active substances—e.g., such materials as sperm oil, sperm whale oil, carnauba wax, candelilla wax, spermaceti, lanolin, beeswax, ozokerite, ceresin, synthetic waxes, etc., having adverse solubility characteristics—it is preferred to dissolve such mixtures in an inert solvent—e.g., olefine-free hydrocarbons, halogenated hydrocarbons, benzene, cyclohexane, dioxan, etc., for treatment according to this invention. The separation of the olefine-mercury addition product is then readily affected in the same manner as in the case of olefine mixtures which are liquid, as hereafter described.

Treatment of liquid olefine mixtures according to this invention is satisfactorily carried out by treating the liquid olefine mixture with a reaction solution comprising a mercury salt of an organic acid and an active material to form the olefine-mercury addition products as above noted. If the addition products are insoluble, as occasionally is the case, both in the olefine mixture and in the reaction solution, they readily precipitate and can be separated by filtration in known manner. More frequently, however, the addition products remain soluable in either the original olefine mixture or the reaction solution and must be separated therefrom by other means.

Such separation can readily be accomplished by washing the resultant mixture with water in order to remove the organic acid liberated in the reaction and any excess in the mercury salt. Thereafter the separation of the olefine mercury product from the washed reaction mixture is accomplished by fractional distillation or selective adsorption, after which regeneration of the olefine and mercury salt is accomplished as noted.

Most, if not all, of the olefine-mercury addition products produced according to this invention have a tendency to decompose at temperatures in excess of above 50°–60° C. Accordingly, separation of the addition products from the reaction mixture by distillation is inappropriate if the boiling or distillation range of the materials is above this temperature. With high boiling materials, however, separation can be accomplished by special distillation techniques including, for example, isothermal fractionation or rectification in a heated stream of a carrier gas in a distillation column.

Also, the olefine-mercury addition products are satisfactorily and readily separated from the reaction mixture by selective adsorption on such substances as activated carbon, cellulose, sugar, aluminum oxide, fuller's earth, and the like, and preferably on silica gel, which has a marked adsorption power for olefine-mercury addition products according to this invention. In such techniques the reaction mixture is added to silica gel in a column, but only after the mixture has been dissolved in an inert solvent, such as cyclohexane, to remove therefrom any excess of hydrogen-active material. If such material is not removed, it is preferably adsorbed by the silica gel before the desired olefine-mercury addition product thus decreasing the efficiency and ease of the adsorption separation. The hydrogen-active component can be scrubbed out with water from the solution of the reaction mixture in the inert solvent.

As will be understood by men skilled in this art, there are readily available various methods for separating the olefine-mercury addition products, the selection of a particular one of which will depend upon, among other factors, the quantity of material to be treated as well as the olefine content of the mixture being separated, and due regard must be given to the selection of a particular mercury salt and a particular hydrogen-active component to obtain optimum operating conditions. For example, in mixtures having low olefine content, the addition products may most economically be separated by adsorption to avoid the distillation of large volumes of unreacted components. With mixtures of high olefine content, on the other hand, the separation may be most economically accomplished by distilling off unreacted components of the reaction mixture since separation by adsorbing the addition products may lead to consumption of the adsorption agent in an uneconomical manner.

The selection of a particular hydrogen-active solvent or material for the reaction solution is made, as will be understood, with due regard to its solubility characteristics with respect to the mixture to be separated as well as its ability to dissolve the particular mercury salt to be utilized. It is preferred to work at fairly high concentrations of reactants in order to keep the solvent requirements and the time of reaction as low as possible. Nevertheless, sufficient hydrogen-active material must be present, as will be understood, to maintain the reaction velocity in the reaction solution at practicably high levels. Satisfactory results are obtained according to this invention when the hydrogen-active material is present as the solvent in the reaction solution in a concentration of about 60% to 80% thereof.

Satisfactory results have also been obtained according to this invention by carrying out the olefine-mercury reaction with agitation in a mixture of two liquid phases rather than in a homogeneous solution. One phase consists principally of the reaction solution of hydrogen-active solvent and mercury salt with, of course, some dissolved olefine mixture, while the second phase consists principally of the olefine mixture to be separated and minor dissolving portions of the first phase. The addition reaction then takes place continuously in the first mentioned phase, while the second phase continuously adds additional olefine material to the first phase to make up for that which is entering into the addition reaction. When carried out in this manner, after completion of the reaction, it is merely necessary to separate the two liquid phases in known manner and to scrub the phase containing the addition products to remove therefrom traces of the original mercury salt and/or the organic acid liberated during the reaction. The phase with the hydrogen-active solvent can then be treated with fresh mercury salt and is then available for reaction.

It should also be noted that the selection of hydrogen-active solvent should be made such that the solvent does not enter into undesired side reactions with the mercury salt. Thus, with materials such as diethylamine and benzyamine, reaction between the mercury salt and the solvent would take place more rapidly than the desired addition reaction for the olefine material. If an alcohol is employed as the hydrogen-active solvent, the reaction should be maintained in an acidic condition to avoid alcoholysis of the mercury salt which leads to the separation of the mercury oxide. Preferably, the acid used to maintain the acidity of the reaction mixture is the acid of which the mercury salt is a salt—i.e., using acetic acid when mercury acetate is being used. Also, if the mercury salt itself is to be formed during the reaction in the reaction solution (e.g., by preparing the reaction solution from mercuric oxide and the desired acid), an excess of the acid should be maintained. The ease of controlling the reaction and accomplishing the methods embodying this invention can be enhanced, as will be understood, if the mercury salt and hydrogen-active reactants are selected to have physical or solubility properties differing from the olefines, being treated. For example, for higher boiling olefine substances, low boiling reactants are selected and vice versa, or for instance, for non-water soluble olefine substances, water-soluble addition reactants are selected to aid in separation of the materials.

Furthermore, with due regard to the varying reaction velocities with which olefine-mercury addition products are formed for various types of olefine substances, individual olefines can also be separated from each other according to this invention. As will be understood, the olefine structure has a substantial determinative affect on the reaction velocity. That is, the 1-olefines react most rapidly, whereas, in the case of olefine substances having the double bond in other than the terminal position, the trans- compounds react more rapidly than cis- compounds, and branched chains, if located adjacent the double bond, also have a pronounced influence on reaction velocity, hence individual olefines can be separated from each other according to this invention by taking advantage of the differing reaction velocities of reaction products formed as well as by differing solubilities thereof and, after separation of the reaction products from the reaction mixture by ester rearrangement of the olefine materials. Thus, not only olefines having a different number of carbon atoms can be separated from each other according to this invention, but also olefines having the same number of carbon atoms but with the double bond in different positions. Thus, decenes are separated from hexenes, 1-hexene from 2-hexene, iso-branched olefines from straight chains, and cis- trans- isomers from each other, all according to this invention.

As illustrative of the versatility of this invention, satisfactory results have been achieved by using for the mercury salt reactant, acetate, propionate butyrate, caprylate, stearate, benzoate, salicylate, chloracetate, adipinate, oxalate, malonate, succinate, phthalate, lacate, tartrate, citrate, acetylacetate and acetylsalicylate, among others. Also, as the hydrogen-active reactant, satisfactory results have been achieved using, among others, water, methyl alcohol, ethyl alcohol, isopropyl alcohol, isoamyl alcohol, benzyl alcohol, cyclohexanol, glycol, glacial acetic acid, propionic acid, butyric acid, oxalic acid, malonic acid, chloracetic acid, lactic acid, anilin, methylanilin, ethylanilin and acetone. As will be noted, various combinations of the foregoing materials, result in a wide selection of appropriate reactants of widely varying physical properties to correspond to the particular reaction system from which it is desired to separate the olefines or from which it is desired to produce the olefine-mercury reaction products.

The practising of this invention will be understood with reference to the following illustrative examples:

(1) Propylene is introduced at room temperature into 250 cc. of a 10% solution of mercuric acetate in methyl alcohol which can be done both with and without pressure. The reaction is checked by removing from time to time small samples of the solution and treating them with alcoholic potassium hydroxide solution. The reaction is complete when the potassium hydroxide solution no longer causes a precipitation of mercuric oxide.

For the isolation of the addition compounds, the methyl alcohol and the glacial acetic acid formed in the reaction were driven off under vacuum and the addition product was then sublimated in a high vacuum.

Ethylene mercuric acid is prepared in the same way in methyl alcohol. Instead of propylene or ethylene a technical cracked gas which contains a mixture of these olefines may also be introduced into the reaction solution.

(2) 3 cc. of styrene are added with 3 grams of mercuric acetate into 12 cc. of isoamylalcohol and shaken on a water bath at 40° C. until the mercuric salt has dissolved. In order to check the completeness of the reaction, 2 to 3 drops of the reaction solution are added to 0.5 to 1 cc. of 1-Normal methanol hydroxide solution. When no mercuric oxide precipitates any longer, the reaction is complete since the styrene was present in the reaction solution in about a 100% excess. The acetic acid and isoamyl alcohol as well as the excess styrene are distilled off in vacuum and the addition product of mercuric salt and styrene which remains is recrystallized from an ordinary solvent, for instance dioxan.

(3) 10 cc. tridecene and 10 cc. tridecane are dissolved in 50 cc. of cyclohexane; into this cyclohexane-tridecane-tridecene mixture, there is added, while stirring, a reaction solution consisting of 20 grams mercuric propionate, 5 cc. of propionic acid and 200 cc. ethyl alcohol and heated for 20 minutes to 40° C. After cooling to room temperature, 60 cc. of water is added to the solution and the solution is separated in a separating funnel and washed three times with separate portions of 200 cc. of water to each of which 1 cc. propionic acid has been added. The washed solution is concentrated at 40° C. in a waterjet vacuum with the interposition of a cooled trap in which the cyclohexene collects. The remaining solution of tridecene-mercury addition product (ethyoxy-mercuric propionate-tridecane) in tridecane is charged into a carrier gas column and the tridecane is distilled off with methanol vapor at 15 mm. Hg and 40° C. The tridecene-mercury addition remaining as distillation residue is decomposed with aqueous hydrochloric acid and the mercuric chloride, ethyl alcohol and propionic acid produced by this decomposition, as well as the excess hydrochloric acid, are separated from the tridecene by repeated washing with water.

In order to obtain the tridecene in a completely pure form, the same batch of tridecane-tridecene-cyclohexane mixture is treated in the same manner with the same reaction solution, but then the addition product remaining as residue in the carrier gas distillation is dissolved in 100 cc. of ethyl alcohol whereupon there are added 100 cc. 2-normal methanol ammonium thiocyanate solution and thereupon slowly with continuous shaking, 50 cc. of 4-normal aqueous hydrochloric acid. After the addition of 600 cc. of water, the tridecene which separated out was dissolved in 20 cc. of cyclohexane, separated in a separatory funnel, washed twice with separate portions of 100 cc. of water, and dried with calcium chloride and the cyclohexane then distilled off. The determination of the iodine number confirms the purity of the tridecene.

In the same way, it is possible to separate the tridecene from the tridecene-tridecane-cyclohexane mixture when other reaction solutions are used, as, for instance, mercuric acetate in isopropanol, mercuric butyrate in methanol, mercuric butyrate in cyclohexanol, mercuric butyrate in benzylalcohol, mercuric propionate in anilin, mercuric acetate in glacial acetic acid, mercuric butyrate in butyric acid, etc.

In a similar manner, cyclohexane, for instance, may also be separated from a mixture of cyclohexene-cyclohexane pentadecane with any of the reaction solutions according to this invention.

(4) The cyclohexane-tridecane-tridecene mixture of Example 3 is treated with the same reaction solution in the same manner and the solution which has been freed by washing from ethyl alcohol, propionic acid and mercuric propionate and consists of the tridecene-mercury addition product, tridecane and cyclohexane is brought into a silica gel adsorption column of a packed height of about 30 cm. and a diameter of about 1.8 cm. and thoroughly washed with 1 liter of cyclohexane. Thereupon, washing is effected with cyclohexane to which 5% ethyl alcohol has been added until the efflux solution gives a positive mercury reaction with ferric thiocyanate and thereupon the addition product is completely elutriated with pure ethyl alcohol. By the introduction of gaseous hydrogen chloride, the addition product is then decomposed, the mercuric chloride, propionic acid, hydrogen chloride and ethyl alcohol removed by extracting four times with separate portions of 150 cc. of water and the tridecene isolated by vacuum distillation. The determination of the iodine number confirmed the purity of the tridecene. In a similar manner, the tridecene can be separated from the mixture also with any of the reaction solutions of the invention, as in Example 3.

(5) To a mixture of 10 cc. tridecene and 90 cc. mineral oil (iodine number 4.5) there was added a solution of 25 grams mercuric propionate in 250 cc. propionic acid to which 30 cc. of water had been added. By this addition of water, the absorption power of the propionate solution was reduced to such an extent that only about 30 cc. of the tridecene-mineral oil mixture was still dissolved therein. For the carrying out of the action, stirring was effected for one-half hour at about 35° C. followed by cooling, the addition of 600 cc. of water and separation in a separatory funnel. After the lipoid phase had been washed out with water and the tridecene-mercury addition product adsorbed with silica gel, the iodine number of the remaining hydrocarbon mixture was found to be 4.3 and the pure tridecene was obtained from the addition product in the same manner as described in Example 4.

In order to reduce the absorption power of the mercury propionate solution for the addition products formed during the reaction, a solution of 25 grams mercuric propionate in 150 cc. of propionic acid and 70 cc. of water was used in a further experiment for the addition of the tridecene. This solution absorbed only 2 cc. of the hydrocarbon mixture. In this case, also, stirring was effected again for one-half hour at about 35° C. followed, after the addition of 300 cc. of water, by separation, washing and adsorption. The iodine number of the unreacted hydrocarbons was 4.7. The pure tridecene was again obtained in the same manner as described in Example 4.

(6) In order to test the separation also on a technical hydrocarbon mixture, a Fischer-Tropsch "Kogasin" having an iodine number of 4.45 and a boiling point range of 219–321.5° C. was added. For the separation of the olefines, there was used a 10% ethyl alcohol solution of mercury propionate. In order to determine the influence of an excess of mercury propionate, three different samples were prepared:

| Number | Kogasin, cc. | Hg-Propionate, g. | Ethyl Alcohol, cc. |
|---|---|---|---|
| 1 | 50 | 17 | 350 |
| 2 | 50 | 7 | 300 |
| 3 | 100 | 7 | 500 |

The equivalent quantities would be 6.05 grams of mercury propionate for 100 grams of the mixture. For each gram of Hg propionate there was furthermore added 1 cc. of propionic acid in order to prevent the precipitation of mercury oxide by alcoholysis. Due to the low olefine concentration in the Kogasin, the reaction was continued for 60 hours at room temperature. Thereupon, after the water-soluble components had again been removed by extraction with water, the addition products were separated with columns filled with silica gel of a packed height of 20 cm. and a diameter of 1.8 cm. and the iodine number of the non-absorbed hydrocarbon mixture determined. In the case of Sample 1 it was 0.15, in the case of Sample 2, 0.70, in the case of Sample 3, 0.97; in other words, it was possible to separate the olefine components very extensively despite the fact that there are apparently concerned olefines having a very slowly reacting double bond in central position.

For the isolation of the olefine components, the adsorption columns were each filled with ¼ liter cyclohexane, whereupon the addition products were elutriated with ethyl alcohol and decomposed by the introduction of hydrogen chloride. For the removal of alcohol, hydrochloric acid, propionic acid and mercuric chloride, washing was effected three times with separate portions of 200 cc. of water, whereupon the cyclohexane was evaporated on a water bath and the iodine number of the distillation residue determined and found to be 63.3.

(7) It was furthermore attempted to separate a technical mixture, namely a cracked gasoline having an iodine number of 37.2 by the same method. For this purpose 50 cc. of cracked gasoline were reacted with a solution of 30 grams mercuric propionate in 100 cc. of propionic acid and 60 cc. of water while stirring for one-half hour at about 35° C. Instead of the expected addition reaction however, a very strong precipitation rapidly occurred. The precipitate was filtered off, washed with ether, dried and weighed. By determining the mercury content and by qualitative tests for mercurous ions (black coloration with caustic solution or ammonia), the precipitate was identified as mercurous propionate which had been formed by reduction by the very reactive double bonds of the cracked gasoline from the mercuric propionate.

Since a repetition of this run at a temperature of 20° C. again gave a strong precipitation of mercurous propionate, 100 cc. of gasoline were reacted in a new batch with a solution, cooled to 0° C., of 30 grams mercuric propionate in 200 cc. propionic acid and 120 cc. of water by stirring for one-half hour on an ice bath. At this temperature, no formation of mercurous compound could be noted. For the purification 600 cc. of water were added followed by separation in a separatory funnel, again washing with water and finally adsorption on silica gel. The determination of the iodine number of the olefine-poor fraction which had passed through the adsorption column gave a value of 18.1. Upon increasing the reaction time from one-half hour to ten hours, it was possible to decrease the iodine number to 2.1.

For the isolation of the olefine-containing fraction, the column was elutriated with ethyl alcohol and the addition compounds dissolved in the ethyl alcohol decomposed by the addition of 30 cc. fuming sulfuric acid and the olefine-containing hydrocarbon fraction isolated by the scrubbing out of the ethyl alcohol. The iodine number was 66.5 for a time of reaction of one-half hour and 94.9 for a time of reaction of 12 hours.

(8) An industrially obtained cracked gas which consists of 52% olefines (mainly propylene) and 48% paraffin (mainly propane) was introduced at a pressure of 4 atm. over a frit from below into a steel tube of a length of 800 mm. and a diameter of 50 mm. The steel tube can be heated and is held at 50° C. (not substantially higher). The reaction solution, for instance propionic acid in methyl alcohol passes via a Bosch pump into the top of the steel tube which serves as reaction vessel and discharges at the bottom via a lock into a collector vessel. At the top, the unreacted gas is withdrawn, reduced in pressure, measured and analyzed. After only one pass, the olefine content of the gas withdrawn at the top is only 11% as compared with 52% in the case of the initial mixture. If two additional reaction vessels are connected in series with the first, the gas withdrawn at the top of the third reaction vessel consists practically only of propane. The complete separation of the olefine and paraffin can also be obtained with one reaction vessel if the waste gas is again returned and passed through again. By introducing HCl into the reaction solution withdrawn at the bottom of the reaction vessel, the propylene is liberated with a strong effervescing of the solution. The $HgCl_2$ is precipitated from the solution with $Ca(OH)_2$ in the form of HgO, filtered off, again combined with the propionic acid-methanol solution and again used as reaction solution.

In the same way, it is possible to effect the continuous separation of the cracked gas with for instance mercuric caprylate in n-octyl alcohol or any other combination of the reaction solutions. If there are employed as hydrogen-active substances, water-insoluble alcohols and mercury salts of water-insoluble alcohols and mercury salts of water-insoluble organic acids, the decomposition of the olefine-mercury addition products is effected with hydrous hydrochloric acid and not with gaseous hydrogen chloride.

(9) 5 grams styrene and 5 grams eutanol (mixture of unsaturated alcohols having 14 to 18 C-atoms of an average molecular weight of about 260) were dissolved in 200 cc. pentane-hexane mixture. Into this solution, there was slowly introduced a reaction solution consisting of mercuric acetate in methyl alcohol, with strong agitation, until a sample which was taken reacted positively to mercury. For the removal of the methyl alcohol and the excess mercuric acetate, three washings are effected with water, there separating out an oily product which can be caused to crystallize in an ice bath. The oily product, or product which has been crystallized by cooling, proves to be the styrene-mercuric addition product. By decomposition with dilute hydrochloric acid, the styrene is regenerated from the product.

The washed pentane-hexane solution which contains the eutanol-mercury addition product is evaporated with a waterjet vacuum at 40° C. and the oily residue identified as eutanol-methoxy-mercuric acetate. By treatment with dilute HCl, followed by washing with water, the eutanol is held back. If it is desired to obtain the eutanol entirely pure, the oil is extracted in ether, the ethereal solution is washed several times with water, dried with sodium sulfate and then decomposed with dilute hydrochloric acid.

(10) 5 grams cinnamic acid ethyl ester are dissolved in a mixture of 50 cc. benzene and 50 cc. cyclohexane; this solution is treated with a reaction solution of mercuric acetate in methanol solution at 50-60° C. and then washed three times with 150 cc. of water in order to remove the methyl alcohol and mercuric acetate. The washed solution is freed from the greater part of the benzene and cyclohexane by the application of a waterjet vacuum and the concentrated solution is strongly shaken with 100 cc. of water to which 1% of glacial acetic acid has been added, the cinnamic acid ethyl ester addition product precipitating as a solid white substance. After filtration, the product is dried in the air and then carefully decomposed with very dilute hydrochloric acid in the cold in order to limit saponification and decarboxylation to a minimum. The free cinnamic acid ethyl ester precipitates on the bottom as a liquid and can be obtained in pure form by thereupon washing with water.

(11) 10 grams 1-pentadecene and 10 grams 2-pentadecene (mixture of the cis-trans forms) are combined and the mixture is treated with the quantity of mercuric acetate in methyl alcohol necessary theoretically to separate the more rapidly reacting 1-pentadecene; the methyl alcohol is distilled off in a vacuum at 40° C., extracted in ether, washed with water in order to remove the acetic acid and methanol ester and dried. After setting aside for several hours, the solid mercury addition product is suction filtered, recrystallized and then decomposed with hydrochloric acid. The yield was 80% pure 1-pentadecene by Raman analysis.

(12) The portion of the mixture of Example 11 which had not reacted with mercuric salt and which contains the cis-2-pentadecene and the trans-2-pentadecene was again reacted with methanol mercuric acetate solution. There was obtained an oily reaction product which could not be caused to crystallize. By reaction with sodium chloride it was possible to decompose the oily product. The crystallized substance could be identified by Raman analysis as trans-mercuric chloride-methoxy-pentadecene, from which the trans-2-pentadecene was obtained by decomposition with hydrochloric acid. The part of the reaction product which still remained oily upon the reaction with sodium chloride could not be caused to crystallize. Raman analysis showed that it consisted to more than 95% of cis-mercuric-methoxy-pentadecene. By decomposition with hydrochloric acid, the cis-2-pentadecene was then obtained.

(13) Stearic acid and octyl alcohol were dissolved in the same cracked gasoline as in Example 7 and HgO was thereupon distributed therein with strong stirring. Reaction temperature 40° C., reaction time 45 minutes. The unreacted part of the hydrocarbon mixture was removed in vacuum at 50° C. The distillation residue was decomposed with hydrochloric acid, washed and dried. The olefine-containing portion was separated by fractionation from stearic acid and octyl alcohol. Iodine number was 86.3.

(14) 0.75 gram cinnamic acid is dissolved in 100 grams petroleum and reacted with mercuric acetate in methyl alcohol. The mercuric addition product is separated by adsorption on activated carbon, purified and thereupon dilute HCl added. The liberated cinnamic acid is filtered off.

(15) Technical lemon oil is dissolved in cyclohexane and reacted with mercuric acetate in isopropylalcohol (propionic acid). The mercuric addition product adsorbed out on silica gel in the manner described, was decomposed, washed with water, dried and distilled in a high vacuum. The distillate consists mainly of lemon oil.

(16) Separate portions of $\frac{1}{100}$ mol of unbranched, pure 1-, 2-cis- and 4-cis-nonene were combined with 5 ml. of nonane and dissolved in 10 ml. of cyclohexane. To this solution, there were added $\frac{1}{100}$ mol mercuric propionate in propionic acid followed after 1 minute by shaking with 100 ml. of water and dried, the cyclohexane solution poured over silica gel and the column given a final washing with 10 ml. of cyclohexane. The cyclohexane solutions growing out of the column are combined and again reacted with the mercuric propionate in propionic acid for 1 minute and thereupon further worked in a similar manner. This process is carried out a total of three times, after which the combined cyclohexane solutions were found not to contain any more 1-nonene by Raman analysis. The adsorbed mercury addition product is displaced from the column with a mixture of ethyl alcohol and water (2:1), HCl is added, the olefine is extracted in ether and dried and the ether distilled off. The distillation residue now consists of about 85% 1-nonene, 12% 2-nonene and 3% 4-nonene (Raman). This mixture is again dissolved in cyclohexane and the entire process similarly repeated. The cyclohexane solutions flowing out of the column are combined with those from the first reaction. After reacting the mercuric addition product three times, followed by decomposition, there is obtained, a practically pure 1-nonene. The cyclohexane solutions are now again reacted in the manner described, but with a reaction time of 5 minutes (until the addition of the water) after which the procedure is similar to the above. After four reactions there is obtained a practically pure 2-nonene (Raman).

It should also be noted that the olefine-mercury salt addition products according to this invention are, in themselves, useful in that they possess active fungicidal and bactericidal properties which are most apparent in the addition products of ethylene and propylene. Accordingly, the teachings of this invention are useful as providing a simple and economical synthesis of such olefine-mercury addition products as such or as intermediaries in the separation of olefine materials from mixtures of other materials.

While the methods and products described herein constitute preferred embodiments of the invention, it is to be understood that the invention is not limited to these precise methods and products and that changes may be made therein without departing from the scope of the invention as defined in the accompanying claims.

What is claimed is:

1. A method of the character described for separating mono-olefinic organic compounds from a mixture with other hydrocarbon substances, comprising the steps of treating said mixture with a reaction solution including a mercuric salt of an organic acid and an organic hydrogen active compound having a reactive hydrogen atom therein, forming by said treatment an addition product of said mercuric salt and said mono-olefinic compound, separating said addition product from said reaction solution and said mixture, decomposing said addition product effecting regeneration of said mono-olefinic compound, and separating said mono-olefinic compound from other components of said decomposed addition product.

2. A method as in claim 1 in which said decomposing of said addition product is carried out in an acid solution in the presence of ions which form substantially undissociating mercuric compounds upon completion of said decomposing step.

3. A method as in claim 1 in which said mercuric salt of an organic acid is formed in situ in said reaction solution during said treating step by adding thereto mercuric oxide and said organic acid for reaction therewith to form said mercuric salt.

4. A method as in claim 1 in which said hydrogen active compound having a reactive hydrogen atom therein is an organic alcohol, and in which said reaction solution is maintained at an acidic pH during said treating step.

5. A method as in claim 1, in which said mercuric-olefin addition product is separated from said reaction solution and said mixture by physical means.

6. A method as in claim 1 in which said mercuric-olefin addition product is separated from said reaction solution and said mixture by distillation.

7. A method as in claim 1 in which said mercuric-olefin addition product is separated from said reaction solution and said mixture by adsorption on an adsorbing medium.

8. A method as in claim 1 in which said step of treating said mixture is effected with a reaction solution with which said mixture is but slightly miscible for forming two liquid phases during said treating step, and in which said mercuric-olefin addition product of said treating step is substantially more soluble in said reaction solution phase than in said slightly miscible mixture phase, and in which said reaction solution phase containing substantially all said mercuric-olefin addition product is separated by decantation from said slightly miscible mixture phase upon completion of said treating step.

9. A method as in claim 1 in which said decomposing of said addition product is effected by reaction thereof with halogen ions for regeneration of said mono-olefinic compound.

10. A method as in claim 9 in which said decomposing of said addition product by reaction with halogen ions is effected in an acidic medium.

11. A cyclic method of the character described for continuously separating mono-olefinic organic compounds from a mixture with other hydrocarbon substances, comprising the steps of treating said mixture with a reaction solution including a mercuric salt of an organic acid and an organic hydrogen active compound having a reactive hydrogen atom therein, forming by said treatment an addition product of said mercuric salt and said mono-olefinic compound, separating said addition product from said reaction solution and said mixture, decomposing said addition product effecting regeneration of said mono-olefinic compound and forming mercuric oxide, converting said mercuric oxide to said mercuric salt of said organic acid to re-form said reaction solution, and recycling said re-formed reaction solution through additional portions of said mixture.

12. A method of the character described for separating a plurality of different mono-olefinic organic compounds from a mixture with other liquid hydrocarbon substances and from each other, comprising the steps of treating said mixture with a reaction solution including a mercuric salt of an organic acid and an organic hydrogen active compound having a reactive hydrogen atom therein, forming by said treatment a plurality of different addition products of said mercuric salt and said mono-olefinic compounds, separating said addition products from said reaction solution and said mixture, and separately decomposing each of said addition products effecting regeneration separately of each of said mono-olefinic compounds.

13. A method as in claim 12 in which all of said mercuric-olefin addition products are separated from said reaction solution and said mixture as a group and are thereafter separated from each other by selective recrystallization prior to said decomposing step thereof.

14. A method as in claim 12 in which all of said mercuric-olefin addition products are separated from said reaction solution and said mixture as a group and thereafter said addition products are separated from each other by ester rearrangement prior to said decomposing step thereof.

15. A method of the character described for separating mono-olefinic organic compounds from a mixture with other hydrocarbon substances comprising the steps of treating said mixture with a reaction solution including a mercuric salt of an organic acid and a hydrogen active compound having a reactive hydrogen atom therein, and selected from the class consisting of water, monovalent and polyvalent aliphatic and aromatic alcohols, monobasic and polybasic aliphatic and aromatic carboxylic acids, hydroxy acids, ketone acids, halogenated organic acids, enols, and aliphatic and aromatic acid amines, and mixtures thereof, forming by said treatment an addition product of said mercuric salt and said mono-olefinic compound, separating said addition product from said reaction solution and said mixture, decomposing said addition product effecting regeneration of said mono-olefinic compound, and separating said mono-olefinic compound from other components of said decomposed addition product.

References Cited in the file of this patent

UNITED STATES PATENTS

| | | |
|---|---|---|
| 1,771,350 | Ramage | July 22, 1930 |
| 2,386,334 | Morris | Oct. 9, 1945 |
| 2,438,018 | Nixon et al. | Mar. 16, 1948 |

OTHER REFERENCES

Aranda et al.: "Combustibles" (Zaragoza, Spain), vol. 10, pp. 183–94 (1950), as abstracted by Chem. Abst., 46, 423–5.

Francis: J. Amer. Chem. Soc., vol. 73, pages 3709–13 (1951).